United States Patent
Greene

[15] 3,659,992
[45] May 2, 1972

[54] EXTRUDING FITTINGS
[72] Inventor: Bernard A. Greene, Gray, Ga.
[73] Assignee: AMSTED Industries Incorporated, Chicago, Ill.
[22] Filed: Oct. 7, 1968
[21] Appl. No.: 765,378

[52] U.S. Cl.................................425/192, 264/323, 425/97, 425/310, 425/381
[51] Int. Cl.........................................................B28b 21/52
[58] Field of Search..................25/14, 15, 17 C, 30 M, 31, 25/39, 127 R, 126; 249/145, 144, 146, 151, 177; 264/154, 323

[56] References Cited

UNITED STATES PATENTS

| | | | |
|---|---|---|---|
| 3,557,290 | 1/1971 | Siegfried et al. | 25/30 |
| 2,497,724 | 2/1950 | Gilson | 25/39 |
| 3,465,075 | 9/1969 | Siegfreid | 25/39 X |
| 3,487,140 | 12/1969 | Laux | 25/30 M X |
| 3,495,308 | 2/1970 | Schulze | 25/39 X |

FOREIGN PATENTS OR APPLICATIONS

| | | | |
|---|---|---|---|
| 1,191,155 | 5/1970 | Great Britain | 25/36 |
| 850,564 | 9/1970 | Canada | 25/30 R |

*Primary Examiner*—J. Spencer Overholser
*Assistant Examiner*—Ben D. Tobor
*Attorney*—Walter L. Schlegel, Jr. and John W. Yakimow

[57] ABSTRACT

A die, engageable with a clay extruding machine, has a given interior configuration corresponding to the out-side configuration of a pipe fitting. A pair of spaced mandrels are inserted through openings in the die and define a branch opening and a main opening therein. A centrifugal cutting blade is rotatably mounted proximate to the main mandrel and is usable to sever the clay in the die from the extruding machine. A circular cutter is also mounted proximate the die to cut away extruded clay left in the space between the branch opening and the main opening.

5 Claims, 3 Drawing Figures

Inventor
Bernard Greene

EXTRUDING FITTINGS

This invention relates to an extruding apparatus, particularly, an apparatus for extruding pipe fittings out of clay.

The invention finds particular utility in the production of vitrified clay fittings used in various piping systems, e.g., sewage and water transmission. These pipe fittings are commonly formed as a Y or T configuration and are used as a junction for a main pipe line and a branch pipe line.

Prior to this disclosure, pipe fittings were generally constructed in two pieces, a main piece and a branch piece. The pieces were then hand molded into a unitary fitting. Branch pipes produced by this conventional process are invariably of less than desired quality. In addition, the hand forming process is slow and tedious work requiring considerable labor by trained personnel. The joints between the two pieces often crack permitting infiltration and exfiltration of fluids. Sealants have often been applied to these joints to eliminate the cracks. These sealants increase the fittings' cost and are often found unacceptable to the user.

It is therefore an object of this invention to provide a new and novel process and apparatus to make pipe fittings.

Another object of this invention is to provide a process and apparatus to produce monolithic pipe fittings that are free of cracks.

Still another object of this invention is to provide a process and apparatus for rapidly and inexpensively producing pipe fittings.

The foregoing and other objects and advantages of the invention will become apparent from the following description and accompanying drawings wherein.

Figure 1:
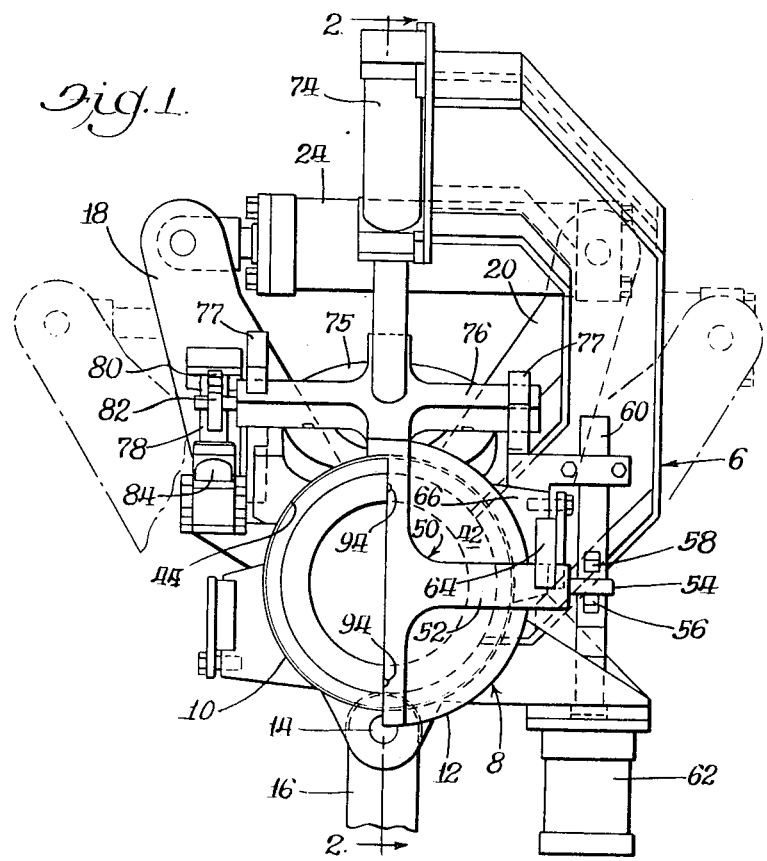
FIG. 1 is a fragmentary front view of a branch pipe extruding apparatus embodying features of the invention.
Figure 2:
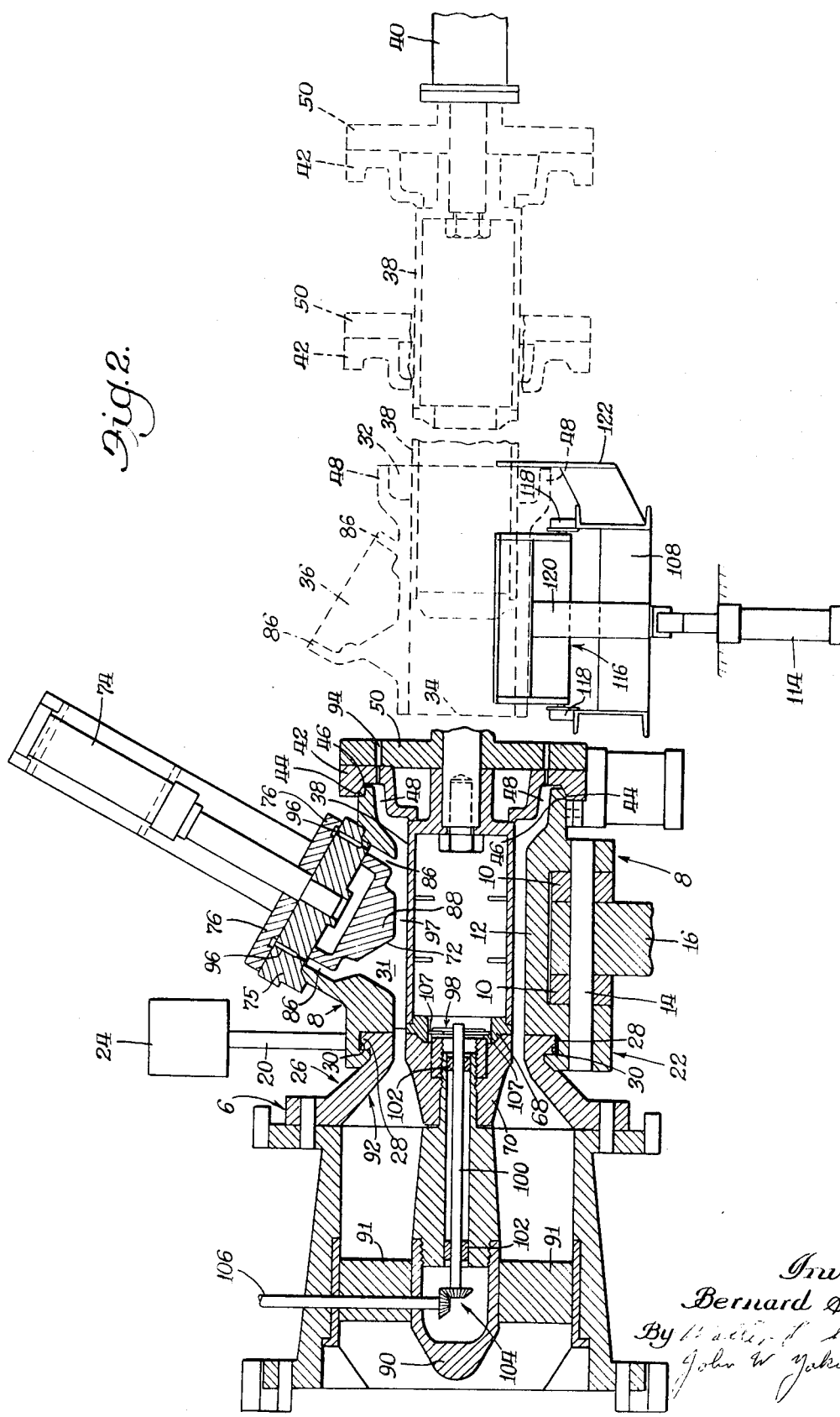
FIG. 2 is a sectional view taken on line 2—2 of FIG. 1 illustrating the extruding apparatus and a removal table.

Referring now to the drawings, FIG. 1 illustrates an extruding apparatus 6 comprising a split extruding die 8 having halves 10 and 12. A pivotal pin 14 (FIG. 2) projects through lower sections of each half 10 and 12 and through a mounting leg 16. The die halves 10 and 12 may be pivoted about the pin 14 into tight mating engagement as shown by the solid lines in FIG. 1 or pivotally opened along the center line 2—2. This engagement and disengagement may be accomplished by arms 18 and 20 respectively secured to the halves 10 and 12 along their rearward end 22 (FIG. 2). A known hydraulic cylinder 24 may be pivotally connected to the upper ends of the arms 18 and 20 and used to pivotally open and close the halves 10 and 12.

The die 8 may be engaged at its rearward end 22 to an extruding head 26 (FIG. 2) of a known extruding machine (not shown). Flanges 28 on the end of the head 26 may be gripped by mating grooves 30 on each half 10 and 12. The flanges 28 and grooves 30 may be designed to form a tight, interlocking, quick release joint when the halves 10 and 12 are closed by the cylinder 24.

The interior of the die 8 may be any desired configuration. As illustrated in FIG. 2, the interior of die 8 defines the exterior surface of a known Y-branch pipe 31. As illustrated by the dash lines, the pipe 31 may have front and rear openings 32 and 34 and a branch opening 36.

A center mandrel 38 may be secured to a known hydraulic cylinder 40 (FIG. 2) and may be used to define the center passage 41 (FIG. 3) that interconnects the openings 32 and 34. A front enclosing collar 42 may be connected to the front end of the mandrel 38. Mating beveled edges 44 and 46 respectively located on the halves 10 and 12 and the collar 42 may be used to form a tight, quick release joint therebetween. These edges 44 and 46 further maintain alignment of the center mandrel 38 in the die 8. The collar 42 may be designed to define the interior of a shown front lip configuration 48 on a fitting 31.

The collar 42 may be secured to the die 8 by a crosslock 50 connected to the collar 42 and having opposed fingers 52 (only one shown in FIG. 1). When the collar 42 is moved into engagement with the die 8 the fingers 52 of the lock 50 will be at a slight angle away from the horizontal. An ear 54 on one of the fingers 52 moves between two lugs 56 and 58 secured to a reciprocating slide 60 that is actuated by a known hydraulic cylinder 62. Upward movement of the slide 60 in FIG. 1 forces the lug 56 against the ear 54 and rotates the opposed fingers 52 behind opposed wedges 64 (only one shown) that are secured to a frame 66 integrally mounted on the die halves 10 and 12. Interengagement of the wedges 64 and the fingers 52 tightly locks the collar 42 to the front of the die 8. Downward movement of the slide 60 forces the lug 58 against the ear 54 moving the fingers 52 away from the wedges 64 and freeing the collar 42 and mandrel 38 for reciprocating movement. It is contemplated that this locking and unlocking action may be accomplished in other ways.

The rearward end of the center mandrel 38 may be provided with a resilient mating beveled member 68 (FIG. 2) that is engageable with a beveled collar 70 in the extruding head 26 to form a quick release seal. The beveled members 68 and 70 further aid in maintaining alignment of the center mandrel 38 within the die 8.

A branch mandrel 72 (FIG. 2) may be reciprocated by a known hydraulic cylinder 74. As previously described for the center mandrel 38, the branch mandrel 72 may also have an enclosing collar 75, and a crosslock 76 that may be engaged with wedges 77 (FIG. 1) by a slide 78 having lugs 80 and 82 and a known hydraulic cylinder 84. The collar 75 and die 8 may be constructed to form a quick release aligning joint therebetween similar to that described for the collar 42. Other means of locking collar 75 are contemplated.

The branch mandrel 72 in its engaged position (FIG. 2) may define the interior of a known lip configuration 86 in the branch of the fitting 31 and its distal end 88 may have a deflecting configuration in the form of a cone, spherical segment or the like. It should be noted that the end 88 does not contact the center mandrel 38 but remains a given distance from that mandrel 38, e.g., one-fourth of an inch, during extrusion of a fitting 31.

In operation, the mandrels 38 and 72 and the interior of the die 8 may be coated with a releasing agent. The die 8 and mandrels 38 and 72 may then be assembled and engaged with the head 26 according to methods previously described. Clay may then be forced in a known manner under pressure into the extruding head 26 around the bullet shaped nose 90 (FIG. 2), between the spider arms 91 and into contact with the annular cone-shaped end 92 of the head 26. The clay then moves over the beveled collar 70 and the center mandrel 38 of the die 8.

Trapped air in the die ahead of the clay is forced out through issue holes 94 and 96 in the collars 42 and 75. As clay passes around the branch mandrel 72 it is partially deflected upwardly into the lip 86 by the coned end 88. As more and more clay is forced into the die 8, all the spaces of the die are eventually filled, resulting in clay being forced out of the issue holes 94 and 96.

The presence of the space 97 between the branch mandrel 72 and center mandrel 38 eliminates a clay knitting problem. Intersection of the mandrels 38 and 72 would split the clay flow around mandrel 72 requiring the clay to knit together on the opposite side of mandrel 72 as it proceeds to fill the die 8. Lack of proper knitting creates troublesome cracks in this area. By separating the mandrels 38 and 72 the clay may flow through this area in an unbroken mass, thus eliminating cracks and resulting in a better, longer lasting monolithic fitting.

The pressure on the clay may be released after a fitting 31 is formed and the front cross lock 50 unlocked by the slide 60 and cylinder 62. The center mandrel 38 may then be moved to the right in FIG. 2 a given distance, e.g., 1 inch, by cylinder 40.

The cross lock 76 on branch mandrel 72 may be similarly unlocked by slide 78 and cylinder 84. The branch mandrel 72 may then be removed from the die 8 by cylinder 74. The cylinder 24 may then be actuated and the halves 10 and 12 pivoted to an open position.

A known rotating cutter 98 (schematically illustrated) may then be used to sever the clay at the junction of the die 8 and the head 26. This cutter 98 may be actuated by a shaft 100 mounted in bearings 102. A known miter gear arrangement 104 may be used to transmit rotational movement of a vertical shaft 106 that is actuated by an outside source, e.g., a motor (not shown), to the horizontal shaft 100 and cutter 98. This rotational movement forces the cutting blades 107 radially outward by centrifugal and frictional forces, thereby severing the clay from the head 26. The rearward end of a fitting 31 may also be severed in other ways, e.g., by opening the halves 10 and 12 and drawing a wire through the clay at the desired point.

Once the clay is severed, the formed fitting 31 may be removed from the die 8. As shown by the dash lines in FIG. 2, this removal may be accomplished among other ways as follows.

Figure 3:
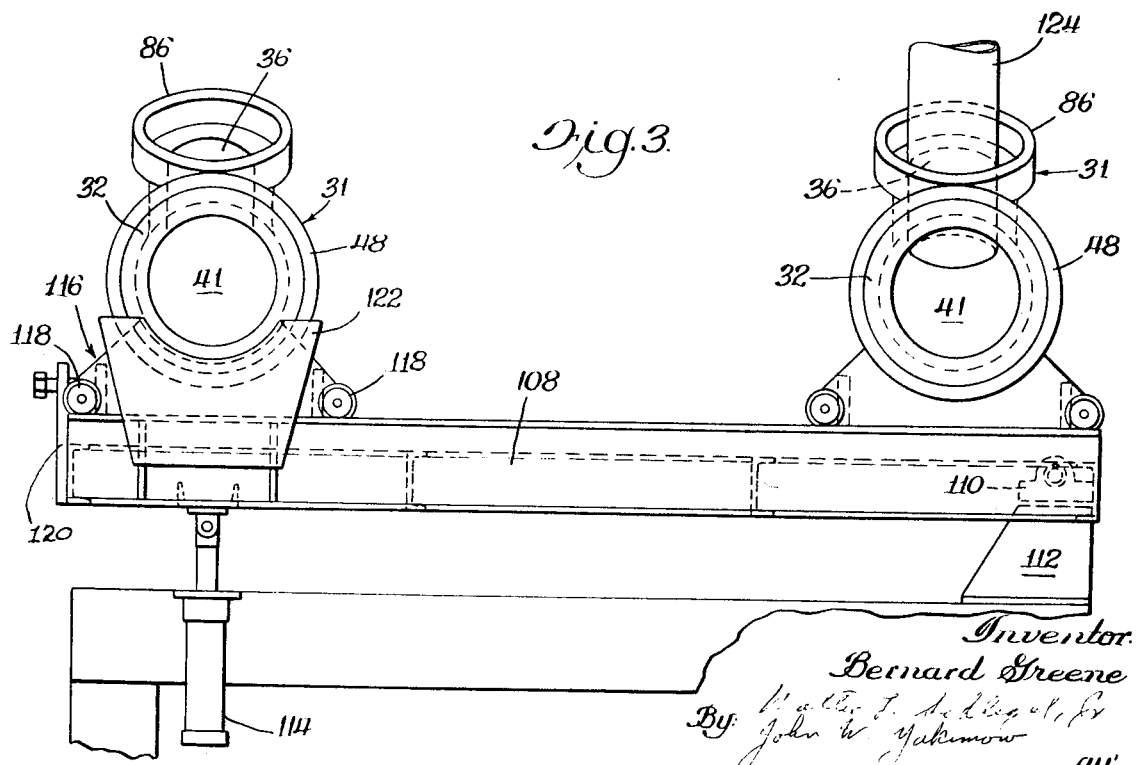
FIG. 3 is a front view of the removal table illustrated in FIG. 2.

A table 108 may be located in front of the die 8 (FIGS. 2 and 3). This table 108 may be pivotally connected by a bearing block 110 secured to a base 112 at one end and vertically actuated for reciprocating movement by a known hydraulic cylinder 114 at the other end proximate the die 8. A pipe fitting transporting cart 116 may be mounted on wheels 118 rotatably engaged with the table 108. A stop 120 may be used to retain the cart 116 on the table 108 when the table is lowered by the cylinder 114.

In removal, the table 108 is lowered. The center mandrel 38 and the engaged pipe fitting 31, which has been severed from head 26, may be moved away from the open die 8 over the table 108 by cylinder 40. The table 108 may then be raised, moving the cart 116 into contact with the fitting 31. The cart 116 may be designed to cradle the fitting 31 and the table 108 may have a front stopper plate 122 that is engageable with a portion of the front lip 48 of the fitting 31. After contact is made between the lip 48 and plate 122, the center mandrel 38 may be extracted from the fitting 31 by further movement of cylinder 40 as shown in FIG. 2.

The cart 116 and fitting 31 may be rolled to a second location on the table 108. A non-rotating thin edged metal pipe 124 (schematically illustrated) may then be inserted into the branch opening 36. This pipe-type cutter is usable to cut away the excess clay that was extruded in space 97 between the branch mandrel 72 and the center mandrel 38. Actuation of the cutter 124 may be by any known linear motion device (not shown). It should be noted that the branch cutting step may also be performed at the extrusion location by a similar apparatus. The cutter 124 and the mandrel 72 could be mounted on a common swivel-type platform and alternately swung into and out of alignment with the branch opening 36 of the fitting 31. It is further contemplated that this branch cutting step may be performed by hand or in other material removing ways.

Once the excess clay in space 97 is removed, the fitting 31 may be fired in a periodic or tunnel kiln (not shown) in a known manner.

Although the invention is illustrated as a method and apparatus for extruding Y-branch pipes it is to be understood that tees and multibranch pipes may also be made in a similar manner.

It is to be further understood that the foregoing description and the accompanying drawings have been given only by way of illustration and example. Changes in form of the elements, rearrangement of parts, and substitution of equivalent elements, which will be obvious to those skilled in the art, are contemplated as within the scope of the present invention which is limited only by the claims which follow.

I claim:

1. An apparatus for extruding pipe fittings from a moldable material comprising: a die having a cavity therein and openings communicating with said cavity and the exterior of said die, said openings including a front and rear opening in substantial alignment and a side opening; a main mandrel which is stationary during extrusion of a pipe fitting located in said cavity, said main mandrel projects through said front and rear openings and has a collar which is stationary during extrusion of a pipe fitting enclosing said front opening; a secondary mandrel which is stationary during extrusion of a pipe fitting located in said cavity and spaced from said main mandrel, said secondary mandrel projects through said side opening and has a collar which is stationary during extrusion of a pipe fitting enclosing said side opening; and extruding means to force said moldable material into said cavity through said rear opening around and between said main mandrel and said secondary mandrel until said material configures to the shape of said cavity and said mandrels.

2. The apparatus set out in claim 1 wherein: said extruding means includes an extruding head having an opening therein and a center section spaced inwardly of said head opening, said head opening and said center section defining a passage therebetween; said die releasably engages said extruding head; said cavity is in communication with said passage in said extruding head; said main mandrel releasably engages said center section; and said moldable material is forced through said passage into said cavity.

3. The apparatus set out in claim 2 wherein: cutting means is located inwardly of said main mandrel proximate said center section, said cutting means including blade means radially extendable to sever the moldable material in said cavity proximate said center section when said main mandrel is spaced from said center section.

4. The apparatus set out in claim 1, 2, or 3 wherein: said die includes sections mounted for engagement along a longitudinal line; said cavity is substantially symmetrical about said longitudinal line; said main mandrel is substantially symmetrical about said longitudinal line; and said secondary mandrel is substantially symmetrical about said longitudinal line.

5. The apparatus set out in claim 1, 2, or 3 wherein: said secondary mandrel has a central axis and an end having a point proximate said main mandrel, said end being substantially symmetrical about said central axis and converging toward said point.

* * * * *